US012785153B2

(12) United States Patent
Xu et al.

(10) Patent No.: US 12,785,153 B2
(45) Date of Patent: Nov. 3, 2026

(54) BATTERY CELL AND BATTERY

(71) Applicant: ZHUHAI COSMX BATTERY CO., LTD., Zhuhai (CN)

(72) Inventors: Tengfei Xu, Zhuhai (CN); Zhichang Zhou, Zhuhai (CN); Donghui Sheng, Zhuhai (CN)

(73) Assignee: ZHUHAI COSMX BATTERY CO., LTD., Zhuhai (CN)

( * ) Notice: Subject to any disclaimer, the term of this patent is extended or adjusted under 35 U.S.C. 154(b) by 0 days.

(21) Appl. No.: 19/181,346

(22) Filed: Apr. 17, 2025

(65) Prior Publication Data

US 2026/0163068 A1 Jun. 11, 2026

Related U.S. Application Data

(63) Continuation of application No. PCT/CN2024/081571, filed on Mar. 14, 2024.

(30) Foreign Application Priority Data

Jun. 20, 2023 (CN) ........................ 202321593402.8

(51) Int. Cl.
*H01M 10/0587* (2010.01)
*H01M 10/0525* (2010.01)
(Continued)

(52) U.S. Cl.
CPC ... *H01M 10/0587* (2013.01); *H01M 10/0525* (2013.01); *H01M 10/4235* (2013.01); *H01M 50/531* (2021.01)

(58) Field of Classification Search
CPC ................................................ H01M 10/0587
See application file for complete search history.

(56) References Cited

U.S. PATENT DOCUMENTS

2023/0361354 A1* 11/2023 Peng ................ H01M 10/0459

FOREIGN PATENT DOCUMENTS

CN 105576294 A 5/2016
CN 209447967 U 9/2019
(Continued)

OTHER PUBLICATIONS

The international search report of PCT Application PCT/CN2024/081571, mailed Jun. 13, 2024, 4 pages with English translation.

*Primary Examiner* — Barbara L Gilliam
*Assistant Examiner* — Jordan E Berresford
(74) *Attorney, Agent, or Firm* — K&L Gates LLP

(57) ABSTRACT

This disclosure relates to a battery cell and a battery, the battery cell comprising a first electrode piece and a second electrode piece, the first electrode piece and the second electrode piece being stacked and coiled together; an end of the first electrode piece comprises a single-side coating area at the interior of the battery cell; the battery cell comprising a correction side being one of opposite sides thereof, spaces are formed between side edges of the second electrode piece and a side edge of the battery cell, and the side edges of the second electrode piece located on the innermost side of the battery cell are offset toward the correction side, with respect to the side edges of the second electrode piece located on the outermost side of the battery cell. The battery cell provided in the present disclosure can improve the energy density of the battery.

15 Claims, 3 Drawing Sheets

(51) Int. Cl.

*H01M 10/42* (2006.01)

*H01M 50/531* (2021.01)

(56) References Cited

FOREIGN PATENT DOCUMENTS

| | | | |
|---|---|---|---|
| CN | 216354375 | U | 4/2022 |
| CN | 220172188 | U | 12/2023 |

* cited by examiner

BATTERY CELL AND BATTERY

CROSS-REFERENCES TO RELATED APPLICATIONS

This disclosure is a continuation of International Application No. PCT/CN2024/081571, filed on Mar. 14, 2024, which claims priority to Chinese Patent Application No. 202321593402.8, entitled with "Battery Cell and Battery", filed with the China National Intellectual Property Administration on Jun. 20, 2023, the contents of which are incorporated herein by reference.

TECHNICAL FIELD

The present disclosure relates to the field of battery technology, and in particular, to a battery cell and a battery.

BACKGROUND OF THE INVENTION

Rechargeable batteries, also known as secondary batteries, refer to electrochemical energy storage devices capable of repeated charge-discharge cycles, such as lithium-ion batteries. These batteries are widely used in mobile power supply devices, including consumer electronics, new energy vehicles, and energy storage systems.

In conventional lithium batteries, a cell is housed within a casing and includes a positive electrode piece, a negative electrode piece, and a diaphragm interposed therebetween. The stacked positive electrode piece, negative electrode piece and separator are typically coiled. At a winding starting end of the battery cell, the negative electrode piece is often coated with an active material layer on a single side. However, such a single-side coating causes the negative electrode piece to curl after rolling, resulting in a narrowed width of the active layer.

BRIEF SUMMARY OF THE INVENTION

To address the above issues, some embodiments of the present disclosure resolve the technical problem of reduced energy density caused by poor prelithiation effects due to the narrowed active layer on the single-side coating negative electrode piece in conventional battery cells.

To achieve this objective, in a first aspect, the present disclosure provides a cell including a first electrode piece and a second electrode piece, which are sequentially stacked and coiled.

In some embodiments, an end of the first electrode piece includes a single-side coating area at the interior of the battery cell; one of the two opposing side of the battery cell is a correction side, spaces are formed between side edges of the second electrode piece and a side edge of the battery cell, and the side edges of the second electrode piece located on the innermost side of the battery cell are offset toward the correction side, with respect to the side edges of the second electrode piece located on the outermost side of the battery cell.

A coverage value of the interior of the battery cell on the correction side is less than a coverage value of the exterior of the battery cell on the correction side, wherein the coverage value is a distance between the edge of the second electrode piece and the edge of the first electrode piece.

In some embodiments of the present disclosure, on the correction side, spaces, between the side edges of the second electrode piece located on the innermost side of the battery cell and a side edge of the first electrode piece, are shorter than spaces, between the side edges of the second electrode piece located on the outermost side of the battery cell and the side edges of the first electrode piece.

In some embodiments of the present disclosure, the side edges of the second electrode piece located on the outermost side of the battery cell are symmetrically provided, with respect to the side edges of the second electrode piece located on the innermost side of the battery cell.

In some embodiments of the present disclosure, on the innermost side of the battery cell, a higher prelithiation degree of the first electrode piece on a side close to the correction side is higher than that of the first electrode piece on a side away from the correction side.

In some embodiments of the present disclosure, spaces, between the side edges of the second electrode piece on the correction side and the side edges of the first electrode piece, are gradually increased from the innermost side of the battery cell to the outermost side of the battery cell.

In some embodiments of the present disclosure, a width of the first electrode piece is $W1$, a width of the second electrode piece is $W2$, the width of the first electrode piece is greater than the width of the second electrode piece, and the second electrode piece at different positions along a winding direction of the battery cell have height difference of H in a first direction, wherein $H=(0.13\sim0.86)\times(W1-W2)$, the first direction is a height direction of the battery cell.

In some embodiments of the present disclosure, on the correction side, distances, between the side edges of the second electrode piece at the outermost side of the battery cell and the side edge of the battery cell, are $L1$, and distances, between the side edges of the second electrode piece at the innermost side of the battery cell and the side edge of the battery cell, are $L2$; wherein, $L1=(1.2\sim13.5)\times L2$.

In some embodiments of the present disclosure, on the correction side, distances, between the side edges of the second electrode piece at the outermost and innermost side of the battery cell and the side edge of the battery cell, are longer than distances, between the side edges of the second electrode piece located between the outermost and innermost sides of the battery cell and the side edge of the battery cell.

In some embodiments of the present disclosure, the battery cell further comprises an electrode tab connected to the correction side of the battery cell.

In some embodiments of the present disclosure, a vacant zone is formed between side edges of the second electrode piece away from the correction side and side edges of the first electrode piece away from the correction side, the battery cell storing a greater amount of electrolyte in the vacant zone than in the correction side.

In some embodiments of the present disclosure, the present disclosure is provided with a battery including a casing and a battery cell in the above technical solutions, wherein the battery cell is provided in the casing.

In addition to the technical problems solved by the present disclosure, the technical features constituting the technical solutions and the beneficial effects brought about by the technical features of these technical solutions described above, other technical problems that can be solved by the battery cell and battery provided by the present disclosure, other technical features included in the technical solutions and the beneficial effects brought about by these technical features will be further described in detail in the specific embodiment methods.

BRIEF DESCRIPTION OF THE DRAWINGS

In order to more clearly illustrate the technical solutions in the embodiments or prior art of the present disclosure, the following will be a brief introduction to the accompanying drawings to be used in the description of the embodiments or prior art, and it is obvious that the accompanying drawings in the following description are some embodiments of the present disclosure, and for the person of ordinary skill in the field, other accompanying drawings can be obtained based on these drawings without putting in creative labor.

FIG. 2 shows a cross-sectional view in the direction A-A of the battery cell in

FIG. 1;

REFERENCE LIST

Figure 1:
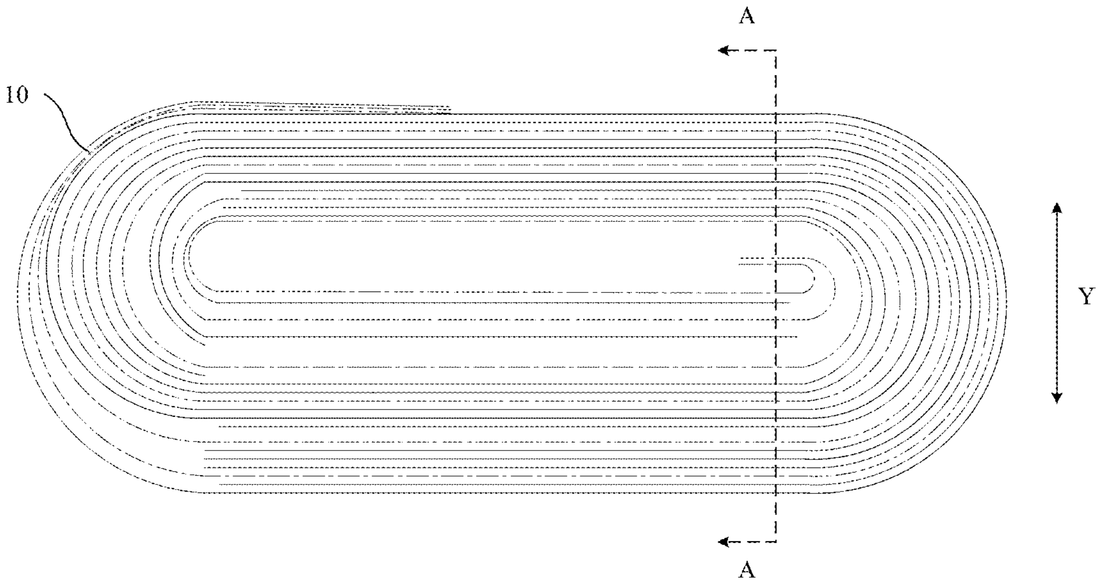
FIG. 1 shows a schematic diagram of a structure of a battery cell provided in an embodiment of the present disclosure.

10-battery cell; 11-correction side; 12-first contour line; 13-second contour line; 14-vacant zone; 100-first electrode piece; 101-single-side coating area; 110-collector; 120-active layer; 200-second electrode piece; 300-diaphragm.

DETAILED DESCRIPTION OF THE INVENTION

In order to make the purpose, technical solutions and advantages of the present disclosure clearer, the technical solutions in the embodiments of the present disclosure will be described clearly and completely in the following in conjunction with the accompanying drawings in the embodiments of the present disclosure. It should be appreciated that the described embodiments are a part of embodiments of the present disclosure instead of all embodiments. Based on the embodiments in this disclosure, other embodiments obtained by a person of ordinary skill in the art without making creative labor fall within the scope of protection of this disclosure.

A rechargeable battery, also known as a secondary battery, is an electrochemical energy device that can be recharged and discharged for recycling, such as a lithium-ion battery, and is widely used in a variety of mobile power supply devices including for example consumer electronic products, new energy vehicles, or energy storage devices. A lithium battery usually includes a battery cell and a shell, the battery cell is provided in the shell, the battery cell includes a positive electrode piece and a negative electrode piece, a diaphragm is provided between the positive electrode piece and the negative electrode piece. The positive electrode piece, the negative electrode piece and the diaphragm which are stacked can be coiled. The negative electrode piece may be coated with an active layer on a single side, at a starting end of the coiled battery cell, and the negative electrode piece with the active layer coated on one side will be curled to a certain extent after being rolled, which makes the negative electrode piece narrower in projection width.

However, in the current configuration of the battery cell, due to the narrowing of the single-side coated active layer of the negative electrode piece, in the prelithiation process of the negative electrode piece, the negative electrode piece is set between two electrode pieces, and the two electrode pieces are anode plates. The active layer provided on the narrowing negative electrode piece narrows, and a space between the negative electrode piece and the anode plate thus becomes larger, resulting in a poor prelithiation effect of the negative electrode piece. Furthermore, in a process of winding the battery cell, the positive electrode piece and the negative electrode piece are stacked and coiled, and the positive electrode piece is aligned to a area of the negative electrode piece with poor prelithiation. During a first charging process of a battery cell fabricated in this way, a large amount of lithium ions in the positive electrode piece is consumed when forming a Solid Electrolyte Interface film (SEI film), resulting in a reduction in the energy density of the battery.

The SEI film is a passivation film layer having the nature of a solid electrolyte, which is mainly formed at a negative electrode of the battery, and is formed by the reaction between a negative electrode material and an electrolyte at the solid-liquid phase interface in the first charging and discharging process of the battery; the SEI film is an insulator for electrons, as well as an excellent conductor for lithium ions.

In one respect of the present disclosure, coverage values of the interior and exterior of the battery cell are adjusted by means of corrective deviation, so as to produce a change in the relative positions of the first electrode piece and the second electrode piece from the interior of the battery cell to the exterior of the battery cell, improve prelithiation degree of the negative electrode piece on the correction side, and give full play to the advantage of the high prelithiation degree on the correction side, while improving a capacity of the battery cell on the non-correction side and enhancing a energy density of the battery.

A battery cell and a battery according to an embodiment of the present disclosure are shown in conjunction with the accompanying drawings. It should be noted that the battery cell provided in the embodiment of the present disclosure is applied in the battery, the battery can be a lithium battery, the lithium battery can be charged and discharged and recycled. The battery cell and the battery can be used in scenarios including, but not limited to, electronic products, energy storage devices, transportation vehicles, such as a new energy vehicle, a charging station, and the embodiments of the present disclosure do not make specific limitations in this regard.

Figure 2:
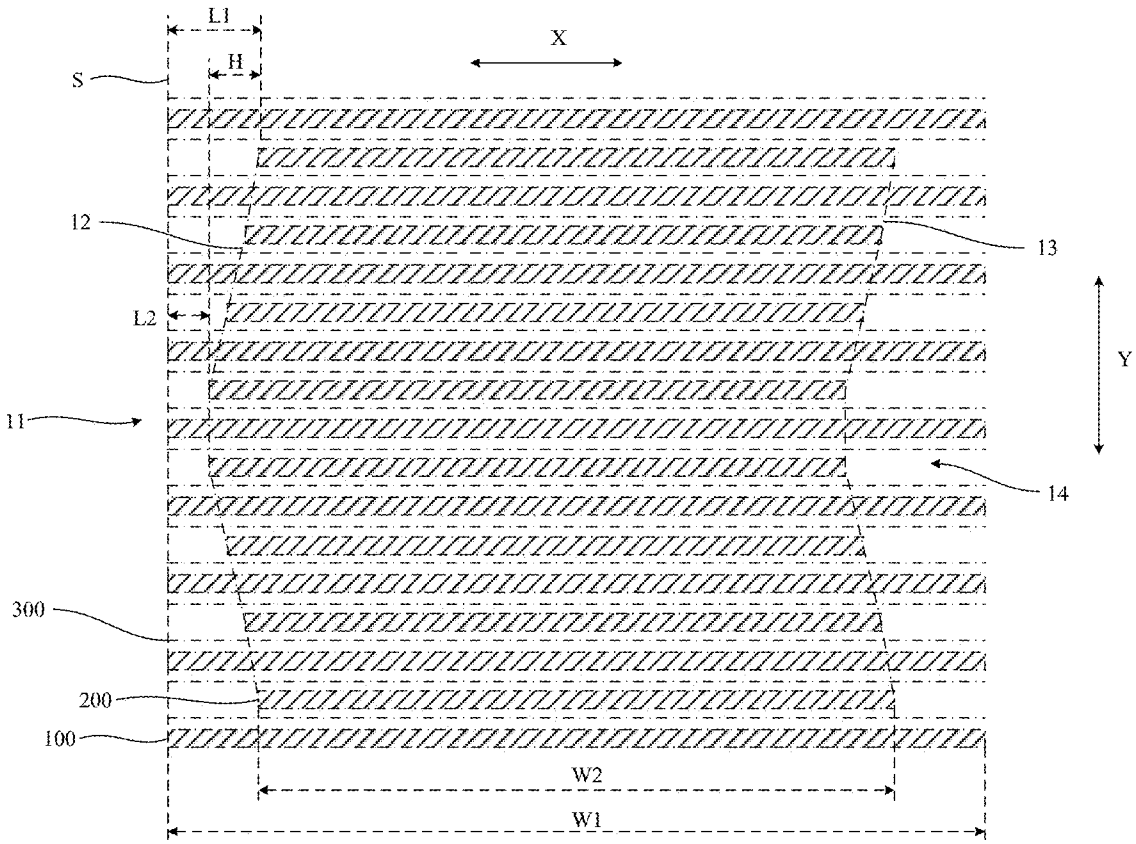
Figure 3:
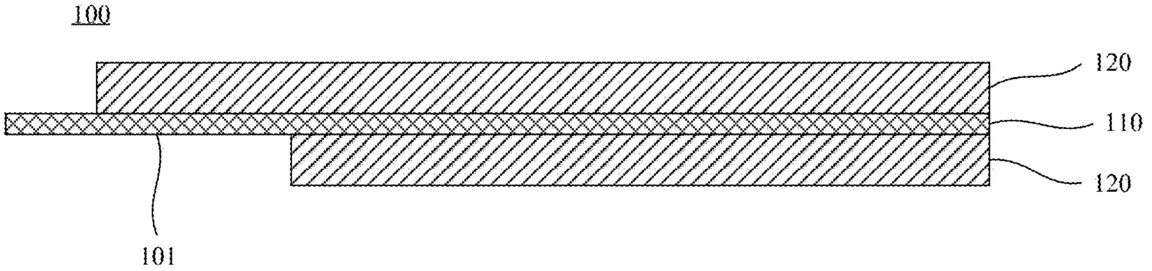
FIG. 3 shows a schematic view of a structure of a first electrode piece in a battery cell provided in an embodiment of the present disclosure.

FIG. 1 shows a schematic diagram of a battery cell according to an embodiment of the present disclosure, FIG. 2 shows a cross-sectional view of the battery cell in FIG. 1 in the direction A-A, and FIG. 3 shows a schematic diagram of a first electrode piece in the battery cell according to an embodiment of the present disclosure.

Referring to FIGS. 1 to 3, an embodiment of the present disclosure provides a battery cell 10, the battery cell 10 includes a first electrode piece 100 and a second electrode piece 200, the first electrode piece 100 and the second electrode piece 200 are sequentially stacked and coiled, and a diaphragm 300 is provided between the first electrode piece 100 and the second electrode piece 200, thereby forming a coiled core configuration. A starting end of the battery cell 10 when it is coiled is a head of the battery cell 10, and an ending end of the battery cell 10 when it is coiled is a tail of the battery cell 10, the head of the battery cell 10 is arranged in an interior of the coiled battery cell 10, and the tail of the battery cell 10 is arranged in the exterior of the coiled battery cell 10.

In the embodiment of the present disclosure, an end of the first electrode piece 100 is provided with a single-side coating area 101, the single-side coating area 101 is provided in the interior of the battery cell 10, wherein the first electrode piece 100 includes a collector 110 and an active layer 120 coated on a surface of the collector 110, the single-side coating area 101 is an area where the collector 110 of the first electrode piece 100 is coated with the active layer 120 only on a side and not coated with the active layer 120 on the other side, forming an empty foil zone. It will be appreciated that the first electrode piece 100 is provided with the single-side coating area 101 at the head, i.e., the winding starting end, of the battery cell 10, while the other areas of the first electrode piece 100 are coated with the active layers 120 on both sides of the collector 110.

In some embodiments, one of two opposing sides with end faces of the battery cell 10 is the correction side 11, side edges of the second electrode piece 200 are spaced apart from a side edge of the battery cell 10, and side edges of the second electrode piece 200 on the innermost side of the battery cell 10 are offset from a side edge of the battery cell 10 located on the outermost side toward the correction side 11.

In some embodiments, the coverage value of the interior of the battery cell 10 on the correction side 11 is less than the coverage value of the exterior of the battery cell 10 on the correction side 11, wherein the coverage value is a distance between the edge of the second electrode piece 200 and the edge of the first electrode piece 100.

It is to be understood that in the interior of the battery cell 10, due to a single-side coating area 101 of the first electrode piece 100, the arrangement of the edge of the second electrode piece 200 and the edge of the first electrode piece 100 can be adjusted during the winding process of the battery cell 10 by means of the correcting process, so as to form the correction side 11 at one end of the battery cell 10. On the correction side 11 and in the interior of the battery cell 10, the edge of the second electrode piece 200 is closer to the edge of the first electrode piece 100, thereby fully utilizing the region of the first electrode piece 100 that has a high prelithiation degree, and a region of the first electrode piece 100 opposite to the second electrode piece 200 has a higher prelithiation degree.

It is to be noted that in the battery cell 10 provided in the embodiment of the present disclosure, the first electrode piece 100 may be a negative electrode piece and the second electrode piece 200 may be a positive electrode piece, i.e., the first electrode piece 100 may be subjected to a prelithiation operation during the production process, and the purpose of the prelithiation is to pre-introduce lithium ions in the first electrode piece 100, so that when SEI film is formed by first charging and discharging the battery cell 10, the pre-introduced lithium ions by the prelithiation of the first electrode piece 100 is consumed, and over-consumption of lithium ions in the second electrode piece 200 is avoided. The more lithium ions held in the second electrode piece 200, the higher the capacity of the battery.

In the prelithiation process of the first electrode piece 100, because the width of the single-side coating area 101 of the first electrode piece 100 becomes smaller after the first electrode piece 100 is rolled, it is possible to correct the first electrode piece 100 to make one edge of the single-side coating area 101 of the first electrode piece 100 closer to the electrode plate of the prelithiation equipment relative to the other edge when prelithiation is performing, so that the prelithiation degree of the single-side coating area 101 close to the electrode plate is higher than that of the other side.

In the winding process of the battery cell 10, the coverage values of the interior and exterior of the battery cell 10 are adjusted by means of a correction, so that the relative positions of the first electrode piece 100 and the second electrode piece 200 change from the interior of the battery cell 10 to the exterior of the battery cell 10, and the side with a high prelithiation degree of the single-sided coating area 101 is opposite to the correction side 11, so as to increase the utilization rate of the high prelithiation degree of the correction side 11, and give full play to the high prelithiation degree of the region of the correction side 11, and the advantage of the high prelithiation degree of the correction side 11 is fully utilized, and the capacity of the battery cell 10 on the non-correction side 11 is increased, so that the lithium ions in the area of the high prelithiation degree on the first electrode piece 100 can be fully consumed in the first charging and discharging to form the SEI film, and the consumption of the lithium ions on the second electrode piece 200 can be reduced to improve the energy density of the battery.

The specific positional pattern of the second electrode piece 200 with respect to the first electrode piece 100 from the interior of the battery cell 10 to the exterior of the battery cell 10 is first described in detail below.

Referring to FIGS. 1 to 3, in an embodiment of the present disclosure, in some embodiments, side edges of the first electrode piece 100 and end faces of the battery cell 10 are provided flush; at a correction side 11, spaces between side edges of the second electrode piece 200 provided on the innermost side of the battery cell 10 and the side edges of the first electrode piece 100, are shorter than spaces between side edges of the second electrode piece 200 provided on the outermost side of the battery cell 10 and the side edges of the first electrode piece 100.

Side edges of the first electrode piece 100 and end faces of the battery cell 10 are provided flush, and on the correction side 11, the side edges of the first electrode piece 100 form a boundary line S, i.e., a leftmost boundary line S in FIG. 2, and at the same time, the boundary line S is the edge line of the battery cell 10.

In some embodiments, the battery cell 10 is a coiled core, therefore in the sectional view perspective of the battery cell 10, the lateral edges of the second electrode piece 200 located on the outermost side of both sides of the battery cell 10 may be symmetrically provided, with respect to the lateral edges of the second electrode piece 200 located on the innermost side of the battery cell 10.

It will be appreciated that the single-side coating area 101 of the first electrode piece 100, in the interior of the battery cell 10, has a higher prelithiation degree on a side close to the correction side 11 than on a side away from the correction side 11. In the region where the second electrode piece 200 is positioned opposite the single-side coating area 101 in the interior of the battery cell 10, the second electrode piece 200 may be set close to the edge of the first electrode piece 100 on the correction side 11, i.e., the second electrode piece 200 is closer to the correction side 11 at the position opposite the single-side coating area 101, and the overlap region of the second electrode piece 200 with the single-side coating area 101 on the correction side 11 may be more.

After the first electrode piece 100 is rolled, the width of the single-side coating area 101 of the first electrode piece 100 is smaller than the area of the first electrode piece 100 that is coated with the active layers 120 on both sides thereof, and in the process of prelithiation of the first electrode piece 100, one of the sides of the single-side coating area 101 can be made to be closer to an electrode piece in the prelithiation process by the correction process, so as to enable the single-side coating area 101 to obtain a higher prelithiation degree on that side. prelithiation degree refers to a mass percentage of lithium in a film layer formed on a surface of the first electrode piece 100 after prelithiation.

It should be noted that the prelithiation is used to "replenish" a portion of the lithium ions into the first electrode piece 100 in advance, which is used to form the SEI film, reduce the consumption of lithium ions in the second electrode piece 200 of the battery, and improve the energy density of the battery. In the embodiment of the present disclosure, by increasing the prelithiation degree of the single-side coating area 101 of the first electrode piece 100 on the correction side 11, the effect of lithium ions in the second electrode piece 200 is reduced when the battery is charged for the first time and the SEI film is formed, and the first coulometric efficiency of the battery is improved, wherein the first coulometric efficiency refers to the ratio of the battery's first charging and discharging capacity to the battery's theoretical charging capacity.

In one possible embodiment, the edges of the end of the second electrode piece 200 close to the correction side 11 are connected in sequence to form a first contour line 12 from the interior of the battery cell 10 to the exterior sides of the battery cell 10, and a distance, between a position of the first contour line 12 close to the single-sided coating area 101 and the edge of the first electrode piece 100 is shorter than a distance, between a position of the first contour line 12 away from the single-sided coating area 101 and the edge of the first electrode piece 100.

It is to be understood that the first contour line 12 is a contour line formed by sequentially connecting endpoints of the second electrode piece 200 in different layers in the interior and exterior of the battery core 10 on the correction side 11, and the first contour line 12 characterizes the change pattern of the relative position of the second electrode piece 200 with respect to the first electrode piece 100 during the winding process of the battery core 10.

Since the single-side coating area 101 has a high prelithiation range on the correction side 11, the first contour line 12 may be closer to the edge of the first electrode piece 100 at a position close to the single-side coating area 101, that is, at the position of the first contour line 12 close to the single-side coating area 101, the coverage value of the battery cell 10 is smaller, making full use of the area with a high prelithiation degree on the single-side coating area 101.

In some embodiments, a width of the first electrode piece 100 is W1, a width of the second electrode piece 200 is W2, the width of the first electrode piece 100 is greater than the width of the second electrode piece 200, and a height difference of the second electrode piece 200, at different positions in the winding direction of the battery cell 10, in a first direction is H, wherein H=(0.13~0.86)×(W1-W2), and the first direction is a height direction of the battery cell 10.

Defining the first direction as the X direction and the second direction as the Y direction, the X direction is perpendicular to the Y direction, the X direction is the height direction of the battery cell 10, the Y direction is the width direction of the battery cell 10, and the Y direction is also the thickness direction of the first electrode piece 100 and the second electrode piece 200 in the section view of the battery cell 10.

It will be appreciated that the first contour line 12 is formed by sequentially connecting ends on the correction side 11 along the Y direction in a section view of the second electrode piece 200. The first contour line 12 has an undulation in the X direction due to the different positions of the second electrode piece 200 with respect to the first electrode piece 100 in different layers of the winding.

In some embodiments, a ratio of a height difference H between the second electrode piece 200 at different positions along the winding direction of the battery cell 10 in the first direction and a difference W1-W2 between a width W1 of the first electrode piece 100 and a width W2 of the second electrode piece 200 may range from 0.13 to 0.86, including but not limited to 0.13, 0.14, 0.2, 0.3, 0.4, 0.5, 0.6, 0.7, 0.8, 0.85, 0.86, and embodiments of the present disclosure do not specifically limit this.

In some embodiments, the coverage value of the exterior of the battery cell 10 on the correction side 11 is L1, and the coverage value of the interior of the battery cell 10 on the correction side 11 is L2, wherein L1=(1.2~13.5)×L2.

It will be appreciated that for the first contour line 12, the first contour line 12 may project toward the correction side 11 of the battery cell 10 at the interior position of the battery cell 10 relative to at the exterior side of the battery cell 10, i.e., the coverage value L2 of the interior of the battery cell 10 is less than the coverage value L1 of the exterior of the battery cell 10.

In some embodiments, a ratio of the coverage value L1 of the exterior of the battery cell 10 on the correction side 11 to the coverage value L2 of the interior of the battery cell 10 on the correction side 11 may range from 1.2 to 13.5, including, but not limited to, 1.2, 1.21, 1.3, 2, 3, 5, 8, 10, 13, 13.4, 13.5, and the embodiments of the present disclosure do not make specific limitations herein.

Examples of different shapes of the first contour line 12 are illustrated below.

Referring to FIGS. 1 to 3, in one possible embodiment, the coverage value of the battery cell 10 on the correction side 11 gradually increases from the interior of the battery cell 10 to the exterior sides of the battery cell 10. From the interior of the battery cell 10 to the exterior of the battery cell 10, the end edges of the second electrode piece 200 on the correction side 11 are gradually away from the edges of the first electrode piece 100.

It is to be understood that the first contour line 12 forms a structure approximating a "V" shape, or similar to a cone shape, so that the second electrode piece 200 can be as much as possible opposite to the high prelithiation area of the single-sided coating area 101 of the first electrode piece 100, fully utilizing the high prelithiation area and improving the energy density of the battery.

Figure 4:
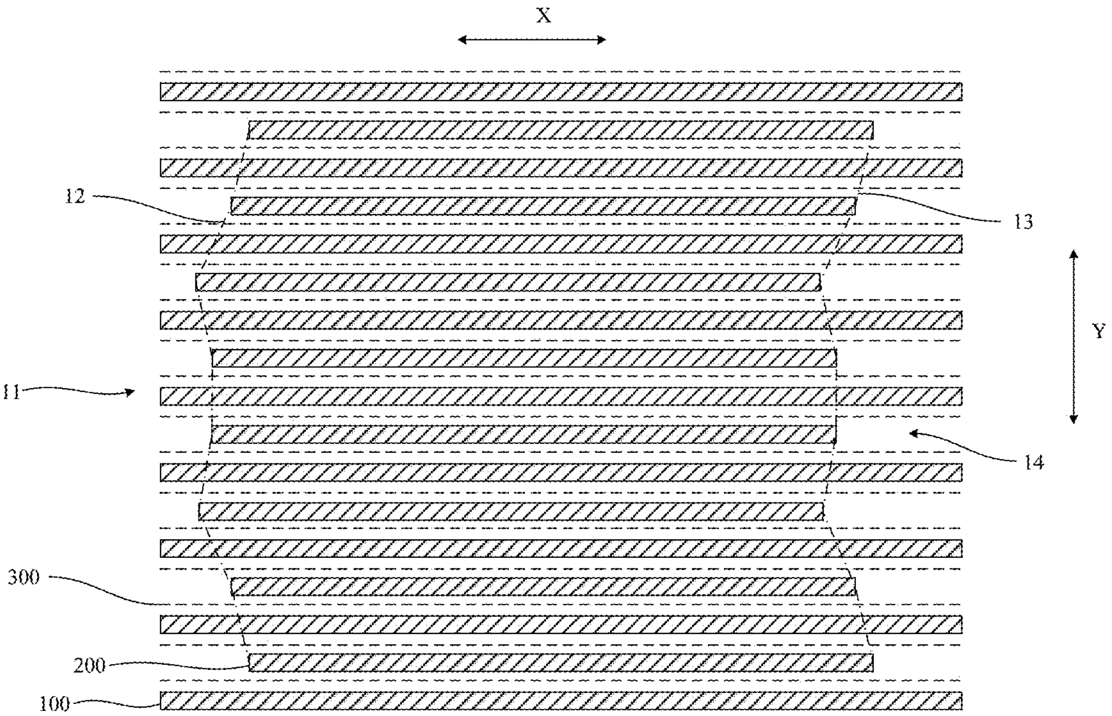
FIG. 4 shows a sectional view of another structure of the battery cell provided by embodiments of the present disclosure.

FIG. 4 is a cross-sectional view of an alternative battery cell provided by an embodiment of the present disclosure.

Referring to FIG. 4, in conjunction with FIGS. 1 and 3, in another possible embodiment, on the correction side 11, a distance between the second electrode piece 200 on the outermost and the innermost sides of the battery cell 10 and the side edge of the battery cell 10 is greater than a distance between the second electrode piece 200 positioned between the outermost and the innermost sides of the battery cell 10 and the side edge of the battery cell.

Wherein the first contour line 12 may be recessed in a direction away from the correction side 11 at a location corresponding to the single-sided coating area 101. A distance, between the middle recessed point of the first contour line 12 and the end of the first electrode piece 100, remains shorter than a distance, between any of two ends of the first contour line 12 and the end of the first electrode piece 100.

It is to be understood that in the winding and correction process of the battery cell 10, there may be a certain lag in the correction of the second electrode piece 200 with respect to the position of the first electrode piece 100, and the first contour line 12 may be formed to carry out an approximate "W" shape, this ensures that there is an undulation of the first contour line 12 while it is as close as possible to the end of the first electrode piece 100 on the correction side 11, within a certain range of the first contour line 12 corresponding to the interior of the battery cell 10, which improves the utilization rate of the region with a high prelithiation degree and improves the energy density of the battery.

It is to be noted that the first contour line 12 may be other shapes with undulations relative to the first direction, such as wavy, serrated, as long as the second electrode piece 200 can be correctively adjusted to correspond to the region of high prelithiation degree in the first electrode piece 100.

In some embodiments, edges of the ends of the second electrode piece 200, away from the correction side 11, are connected in sequence from the interior of the battery cell 10 to the exterior sides of the battery cell 10 to form the second contour line 13, and the shape of the first contour line 12 matches the shape of the second contour line 13.

In some embodiments, the battery cell 10 may further include electrode tabs (not shown), which are connected to the correction side 11 of the battery cell 10. The electrode tabs include a positive electrode tab and a negative electrode tab, wherein the positive electrode tab and the negative electrode tab are connected to one of the first electrode piece 100 and the second electrode piece 200, respectively.

It will be appreciated that the widths of the second electrode piece 200 are approximately same in the winding direction of the battery cell 10, so that when one end of the second electrode piece 200 is moved closer to the correction side 11 with respect to the first electrode piece 100, the distance of the end of the second electrode piece 200 away from the correction side 11 from the end of the first electrode piece 100 away from the correction side 11 increases, and therefore, the second contour line 13 formed by the edges of the ends of the second electrode piece 200 away from the correction side 11 may approximate the shape of the first contour line 12.

It is noted that a vacant zone 14 may be formed between the second contour line 13 and the edges of the ends of the first electrode piece 100 away from the correction side 11, and the amount of electrolyte stored by the battery core 10 in the vacant zone 14 is greater than the amount of electrolyte stored by the battery core 10 on the correction side 11, due to the fact that the prelithiation degree in the single-side coating area of the first electrode piece 100 at the end of the first electrode piece 100 away from the correction side 11 is lower than that on the correction side 11, storing more electrolyte in the vacant zone 14 can realize reorganization process of the SEI film by utilizing more electrolyte during the charge/discharge cycle of the battery and enhance the cycling performance of the battery.

The present disclosure also provides a battery including a casing and a battery cell 10 in the above-described technical solution, the battery cell 10 is provided within the casing. The interior of the casing is injected with an electrolyte. The battery provided by the present disclosure includes all the technical methods and technical effects of the battery cell 10 in the above-described technical solution, which will not be repeated herein.

The effect of the battery cell and battery provided by the embodiments of the present disclosure is illustrated below by comparison of experimental data.

Taking the Si—C system as an example for illustration, the second electrode piece is the negative electrode piece with a width of 78 mm and a compacted density of 1.71g/cm$^3$, and the first electrode piece is the positive electrode piece with a width of 76 mm.

After the positive electrode piece is coated, rolled and pressed and other conventional processed, the positive electrode piece with the same weight are selected and divided into two groups and transferred to winding; after the negative electrode piece is coated, rolled and pressed, the negative electrode piece is transferred to the prelithiation process to carry out chemical prelithiation, and after the completion of prelithiation, correcting the negative electrode piece such that the prelithiation degree on the corrected side is higher than on the non-corrected side, wherein in the region within 3 mm of the edge of the negative electrode piece, the prelithiation degree on the corrected side is about 95%, and the prelithiation degree on the non-corrected side is about 32%.

Taking the structure of the battery cell of the prior art as a control group, the positive and negative electrode pieces in the winding process are set in accordance with the conventional setting, i.e., the positive and negative electrode pieces are centered with respect to the negative electrode piece, ends of the positive electrode pieces are approximated to be flush from the interior of the battery cell to the exterior of the battery cell, and the battery cell has the same coverage value in the interior and the exterior of the battery cell, both are 1.0 mm. After completing coiling, they enter a next step to be assembled into a battery.

With the battery cell provided in the present disclosure as the experimental group, during the winding process, the positive electrode piece in the interior of the battery cell is offset toward the correction side, and the contours of ends of the positive electrode piece are measured as taper from the interior of the battery cell to the exterior of the battery cell by X-rays, and the coverage value of the exterior of the battery cell is 0.9 mm, the coverage value of the interior of the battery cell is 0.2 mm, and the height difference of the positive electrode pieces between the interior and exterior of the battery cell is 1.0 mm.

The batteries formed in the control group and the experimental group are formed and graded under the same environment, the same equipment and conditions, and an average value of the battery capacity of the control group after grading is 2132 mAh, and an average value of the battery capacity of the experimental group is 2145 mAh, the capacity of the experimental group is increased by 0.6%. Thus, the battery provided by the embodiments of the present disclosure can enhance the battery capacity.

For the batteries of the experimental group and the control group, after 800 cycles of 1C/1C at 25° C., the battery capacity retention rate of the control group is 83%, and the thickness expansion change rate is 14.5%; and the battery capacity retention rate of the experimental group is 86.4%, and the thickness expansion change rate is 12.1%. Thus, the battery provided by embodiments of the present disclosure can improve the battery capacity retention rate and reduce the thickness expansion rate of the battery during cycling.

Embodiments of the present disclosure provide a battery cell and a battery, wherein the battery cell includes a first electrode piece and a second electrode piece, the first electrode piece and the second electrode piece are sequentially stacked and coiled, an end portion of the first electrode piece has a single-side coating area, and the single-side coating area is located in an interior of the battery cell; an end portion of the battery cell has a correction side, and a coverage value of the interior of the battery cell on the correction side is smaller than a coverage value of the exterior of the battery cell on the correction side, wherein the coverage value is a difference between an edge of the second electrode piece and an edge of the first electrode piece, the battery cell provided in the present disclosure improves the prelithiation degree of the correction side, giving full play to the advantage of the high prelithiation degree of the correction side, and at the same time improves the capacity of the battery cell of the non-correction side, improves the energy density of the battery.

In the description of the present disclosure, it is to be noted that, unless otherwise expressly specified and limited, the terms "mounted", "connected", "connected" are to be understood in a broad sense, e.g., they can make a fixed connection, an indirect connection through an intermediate medium, a connection within two elements or an association between two elements. One of ordinary skill in the art will understand the specific meaning of the above terms in the present disclosure according to the specific circumstances.

In the description of the present disclosure, it is to be understood that the terms "up", "down", "front", "back", "vertical", "horizontal", "top", "bottom", "interior", "exterior" and the like indicate orientations or positional relationships based on those shown in the accompanying drawings, and are only for the purpose of facilitating the description of the present disclosure and simplifying the description, and are not indicative of or suggestive of the necessity for the device or element referred to to be of a particular orientation, or to be constructed and operated in a particular orientation, and therefore cannot be construed as a limitation of this disclosure.

The terms "first", "second", "third", "fourth", etc. (if any) are used in the specification and claims of the present disclosure and in the above-described drawings are used to distinguish similar objects and need not be used to describe a particular order or sequence. It should be understood that the data so used may be interchangeable, where appropriate, so that the embodiments of the present disclosure described herein can be implemented, for example, in an order other than those illustrated or described herein.

In addition, the terms "including" and "having", and any variations thereof, are intended to cover non-exclusive embodiments, e.g., a process, method, system, product, or apparatus including a series of steps or units need not be limited to those clearly listed, but may include other steps or units that are not clearly listed or that are inherent to those processes, methods, products or equipment.

Finally, it should be noted that the above embodiments are only used to illustrate the technical solutions of the present disclosure, and are not intended to be a limitation thereof; notwithstanding the detailed description of the present disclosure with reference to the foregoing embodiments, a person of ordinary skill in the art should understand that he or she can still make modifications to the technical solutions as documented in the foregoing embodiments, or make equivalent substitutions for some or all of the technical features therein; and these modifications or substitutions do not take the essence of the corresponding technical solutions out of the scope of the technical solutions of the embodiments of the present disclosure.

What is claimed is:

1. A battery cell, comprising a first electrode piece and a second electrode piece, the first electrode piece and the second electrode piece being stacked and coiled together;

the battery cell comprises a correction side being one of opposite sides thereof, spaces are formed between side edges of the second electrode piece and a side edge of the battery cell, and the side edges of the second electrode piece located on an innermost side of the battery cell are offset toward the correction side, with respect to the side edges of the second electrode piece located on an outermost side of the battery cell;

a portion of the first electrode piece located at the innermost side of the battery cell is a single-sided coating area, a first contour line is formed by connecting side edges of the second electrode piece close to the correction side in sequence from an interior of the battery cell to an exterior of the battery cell, and distances, between a point of the first contour line close to the single-side coating area and side edges of the first electrode piece, is shorter than distances, between a point of the first contour line away from the single-side coating area and the side edges of the first electrode piece.

2. The battery cell according to claim 1, wherein, on the correction side, spaces, between the side edges of the second electrode piece located on the innermost side of the battery cell and side edges of the first electrode piece are shorter than spaces, between the side edges of the second electrode piece located on the outermost side of the battery cell and the side edges of the first electrode piece.

3. The battery cell according to claim 2, wherein, the side edges of the second electrode piece located on the outermost side of the battery cell are symmetrically provided, with respect to the side edges of the second electrode piece located on the innermost side of the battery cell.

4. The battery cell according to claim 3, wherein, on the innermost side of the battery cell, a prelithiation degree of the first electrode piece on a side close to the correction side is higher than that of the first electrode piece on a side away from the correction side.

5. The battery cell according to claim 2, wherein, on the innermost side of the battery cell, a prelithiation degree of the first electrode piece on a side close to the correction side is higher than that of the first electrode piece on a side away from the correction side.

6. The battery cell according to claim 1, wherein, on the innermost side of the battery cell, a prelithiation degree of the first electrode piece on a side close to the correction side is higher than that of the first electrode piece on a side away from the correction side.

7. The battery cell according to claim 1, wherein, the first contour line at the interior of the battery cell projects toward the correction side, with respect to at the exterior of the battery cell.

8. The battery cell according to claim 1, wherein, a second contour line is formed by connecting edges of the second electrode piece away from the correction side in sequence from the interior of the battery cell to the exterior of the battery cell, and a shape of the first contour line matches a shape of the second contour line.

9. The battery cell according to claim 1, wherein, spaces, between the side edges of the second electrode piece on the correction side and the side edges of the first electrode piece, are gradually increased from the innermost side of the battery cell to the outermost side of the battery cell.

10. The battery cell according to claim 1, wherein, a width of the first electrode piece is W1, a width of the second electrode piece is W2, the width of the first electrode piece is greater than that of the second electrode piece, and the second electrode piece at different positions along a winding direction of the battery cell has height difference of H in a first direction, wherein $H=(0.13\sim0.86)\times(W1-W2)$, the first direction is a height direction of the battery cell.

11. The battery cell according to claim 1, wherein, on the correction side, distances, between the side edges of the second electrode piece at the outermost side of the battery cell and the side edge of the battery cell, are L1, and distances, between the side edges of the second electrode piece at the innermost side of the battery cell and the side edge of the battery cell, are L2; wherein, L1=(1.2~13.5)×L2.

12. The battery cell according to claim 1, wherein, on the correction side, distances, between the side edges of the second electrode piece at the outermost and innermost side of the battery cell and the side edge of the battery cell, are greater than distances, between the side edges of the second electrode piece located between the outermost and innermost sides of the battery cell and the side edge of the battery cell.

13. The battery cell according to claim 1, wherein, the battery cell further comprises an electrode tab connected to the correction side of the battery cell.

14. The battery cell according to claim 1, wherein, a vacant zone is formed between side edges of the second electrode piece away from the correction side and side edges of the first electrode piece away from the correction side, amount of electrolyte stored in the vacant zone of the battery cell is greater than amount of electrolyte stored in the correction side of the battery cell.

15. A battery, comprising a casing and a battery cell according 1, wherein the battery cell is provided in the casing.

* * * * *